Patented Feb. 4, 1936

2,030,035

UNITED STATES PATENT OFFICE 2,030,035

ORGANIC TELLURIUM COMPOUNDS AND PROCESS OF PREPARING THE SAME

Melvin A. Perkins, Milwaukee, Wis., assignor to E. I. du Pont de Nemours & Company, Wilmington, Del., a corporation of Delaware No Drawing. Application August 26, 1933, Serial No. 687,012

11 Claims. (Cl. 260—61)

This invention relates to novel organic compounds of the benzanthrone series containing tellurium.

It is an object of this invention to prepare novel organic compounds which are useful as intermediates for dyestuffs. Other objects of this invention will appear as the description proceeds.

I have found that Bz1-halogen-benzanthrones, whether otherwise substituted or not, may be reacted with alkali-metal tellurides, whereby the Bz1-halogen atom is exchanged for tellurium. The result is apparently at first a tellurol derivative, which, however, is unstable and oxidizes readily, by atmospheric oxygen, to Bz1,Bz1'-dibenzanthronyl-ditelluride, according to the following general equation:

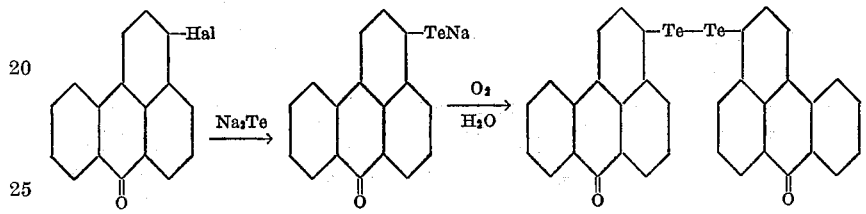

The last mentioned compound is useful as an intermediate for dyestuffs. When fused with alcoholic-caustic potash, it yields isodibenzanthrone.

The alkali-metal tellurides requisite for the reaction are best prepared fresh, by reducing tellurium, or an oxide thereof, in alkaline medium. The reaction is preferably carried out in alcoholic or aqueous-alcoholic solution or suspension, which also contains the halogen-benzanthrone compound. The two reactions thus appear to proceed simultaneously, the alkali-telluride reacting with the halogen-benzanthrone as fast as the former is produced.

It is an interesting characteristic of this process that only the halogen in the Bz1-position is replaced by tellurium. If the benzanthrone compound contains halogen in a different position, say in position Bz2 or 6, the latter remains intact. Similarly, the benzanthrone may be substituted in other positions by various other substituents, such as nitro, amino, hydroxy, methoxy, or sulfo, without any adverse effect upon the reaction.

Without limiting my invention to any particular procedure, the following examples in which parts by weight are given will serve to illustrate my preferred mode of operation.

Example 1

30.9 parts of Bz1-bromo-benzanthrone, 14 parts of tellurium powder, and 3 parts of aluminum (grains) are mixed and suspended in 100 parts of ethyl alcohol. The mixture is heated, while stirring, to 65–75° C. and a solution of 35 parts of potassium hydroxide in 80 parts of water is dropped in, very gradually, over a period of about four hours. During this process the mass darkens and finally becomes blue-black in color. The reaction mass is now further heated at about 80° C. (reflux) for one hour, after which it is diluted with an equal volume of hot water and filtered to rid of a very small residue (mostly unreacted tellurium). The filtered solution is of a dark blue color and doubtless contains the potassium salt of Bz1-benzanthrone-tellurol. Acidification of this solution causes the separation of a rich reddish-brown solid—apparently the free Bz1-benzanthrone-tellurol—which, however, becomes black on exposure to air.

If the filtrate is aerated or treated with mild oxidizing agents, it loses its blue color almost at once, and a gray-black solid is deposited. This solid is filtered off, washed free of alkali, and dried. It forms a gray-black powder which contains a high percentage of tellurium (organically bound). It gives a violet-brown coloration when dissolved in sulfuric acid. On warming with a solution of sodium sulfide, a violet color is imparted to the solution, while alcoholic sodium hydrogen sulfide solutions reduce it with an intense blue color. The compound is very probably Bz1,Bz1'-dibenzanthronyl-ditelluride. It dissolves moderately well in high-boiling solvents such as nitrobenzene and o-dichlorobenzene but does not crystallize upon cooling and so does not readily lend itself to purification.

If, instead of acidifying or oxidizing, the reaction filtrate is salted out, a dark green solid is obtained. When washed with salt solution and dried, a greenish-black solid is obtained which is insoluble in water, but dissolves easily in dilute sodium sulfide solutions with a violet color. This compound is most probably the sodium salt of benzanthrone-tellurol.

It will be understood that the mode of procedure may be varied considerably, as illustrated by the following further examples.

Example 2

30.9 parts of Bz1-bromo-benzanthrone, 14 parts of tellurium powder, and 35 parts of potassium hydroxide are dissolved or suspended in a mixture of 80 parts of water and 100 parts of ethyl alcohol and the mixture is heated to about 75–80° C. At this temperature, 3 parts of aluminum grains or turnings are gradually added over the course of three hours. The mixture gradually darkens and at the end, acquires a dark violet-blue color. After the aluminum has all been added, the charge is refluxed for about one hour to insure complete reaction, then diluted, filtered and worked up as in Example 1. The product is identical with that of Example 1.

Example 3

35 parts of potassium hydroxide are dissolved in 80 parts of water, and 14 parts of tellurium powder are added to the solution. 3 parts of aluminum turnings are then gradually introduced into the warm solution at such a rate that the temperature rises to about 100° C. and is maintained at 100–110° C. This requires one half to one hour. As soon as vigorous reaction has subsided, and the temperature has dropped back to about 70° C., a slurry of 30.9 parts of Bz1,bromo-benzanthrone in 100 parts of ethyl alcohol is added, and the charge is heated to reflux for one hour, diluted, filtered and worked up as in Example 1.

Instead of aluminum, another reducing metal or reducing agent which is effective in alkaline solution may be employed.

Example 4

7.2 parts of zinc dust are substituted for the 3 parts of aluminum in Example 1, all other materials and procedure being the same. A dark violet-blue solution of tellurolate is obtained which appears to be identical with that in Example 1. Bz1-chloro-benzanthrone may be employed as initial material with equal success.

Example 5

26.4 parts of Bz1-chloro-benzanthrone (M. P. 180° C.), 14 parts of tellurium powder and 3 parts of aluminum (grains) are mixed and suspended in 100 parts of ethyl alcohol. The suspension is heated to 70–78 C. and at this temperature a solution of 35 parts of potassium hydroxide in 80 parts of water is run in over the course of several hours. The mixture darkens, finally becoming dark violet-blue in color. It is then diluted and filtered, and the filtrate is heated to boiling for a short time to completely throw out all solid material. About 17.5 parts of brown-black solid are obtained, which appears to be Bz1,Bz1'-dibenzanthronyl-ditelluride, identical with that obtained in Example 1.

If instead of 35 parts of potassium hydroxide, 28 parts of sodium hydroxide are employed, a similar result is obtained.

As already noted, my invention is applicable also to substituted halogen-benzanthrone, and where this additional substituent is also halogen, only the one in the Bz1-position appears to be exchanged.

Example 6

To a mixture of 7.8 parts of 6-nitro-Bz1-chloro-benzanthrone (M. P. 282° C.), 3.5 parts of tellurium powder and 0.8 part of aluminum (grains) in 30 parts of ethyl alcohol at 70–78° C. is added, over the course of two hours, a solution of 9 parts of potassium hydroxide in 20 parts of water. At first, a violet coloration rapidly develops in the mixture. After a short time this violet color gives way to brown. After completing the caustic addition, the mass is heated at the point of reflux for a short time, then diluted and filtered, and the brown tellurium-containing solid is washed and dried. The product is most probably 6,6'-diamino-Bz1,Bz1'-dibenzanthronyl-ditelluride. Upon fusion with alcoholic potash a vat dyestuff is obtained which yields gray-blue dyeings.

Example 7

19 parts of dibromo-benzanthrone (M. P. 257° C.), 7 parts of tellurium, 1,5 parts of aluminum (grains) and 50 parts of alcohol are mixed and heated nearly to the point of reflux. 60 parts of 30% potassium hydroxide are added to the warm mixture over the course of 3 hours with constant agitation. The mixture slowly darkens during this process, finally becoming an intense dark blue. The solution is then diluted, filtered and aerated. A gray-black solid containing both bromine and tellurium is obtained, which upon fusion in alcoholic potassium hydroxide gives a blue-violet vat dye.

The method of converting my novel compounds into dyestuffs is illustrated by the following example:

20 parts of the ditelluride obtained in Example 1 are introduced, at 120–135° C. and with vigorous agitation, into a melt of 40 parts of potassium hydroxide and 40 parts of ethyl alcohol. This melt is further heated to 135–140° C. and maintained at this temperature for about one hour. A bright blue melt is obtained. Upon drowning the melt in cold water, an intense violet coloration is to be noted. The drowned mass is aerated and heated in order to precipitate all of the dyestuff which is then filtered off, washed and dried. If desired, it may be purified by recrystallization from 78–80% sulfuric acid. This dyestuff yields strong violet dyeings on cotton, gives a green solution in concentrated sulfuric acid, and its vat is blue, with strong red-brown fluorescence. It is most probably isodibenzanthrone.

It will be understood that many variations and modifications are possible in my preferred mode of procedure without departing from the spirit of this invention.

I claim:

1. A compound of the group consisting of Bz1,Bz1'-dibenzanthronyl - ditelluride, Bz1 - benzanthrone-tellurol and alkali-metal Bz1-benzanthrone tellurolate.

2. A Bz1,Bz1'-dibenzanthronyl-ditelluride.

3. Bz1,Bz1'-dibenzanthronyl-ditelluride.

4. Bz1-benzanthrone-tellurol.

5. A compound of the general formula:

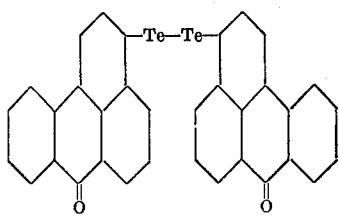

wherein the benzanthrone nuclei may contain simple monovalent substituents.

6. The process of preparing an intermediate for dyestuffs which comprises reacting a Bz1-halogen-benzanthrone with an alkali-metal telluride.

7. The process of preparing a benzanthrone-tellurium compound, which comprises reacting a Bz1-halogen-benzanthrone with freshly formed alkali-metal telluride.

8. The process of preparing a benzanthrone-tellurium compound, which comprises reacting in aqueous-alcoholic medium, a Bz1-halogen-benzanthrone, a compound selected from the group comprising tellurium and its oxides, a caustic alkali and a reducing metal.

9. The process of preparing a dibenzanthronyl-ditelluride, which comprises reacting a Bz1-halogen-benzanthrone with an alkali-metal telluride in alkaline, aqueous-alcoholic medium, and oxidizing the solution of the intermediate tellurol compound formed to precipitate the corresponding dibenzanthronyl-ditelluride.

10. The process of preparing a Bz1-benzanthrone-tellurol compound, which comprises reacting a Bz1-halogen-benzanthrone with an alkali-metal telluride in alkaline, aqueous-alcoholic medium and salting out the solution of the tellurol compound formed.

11. In the process of preparing a Bz1-benzanthrone-tellurium compound, the step which comprises feeding gradually an aqueous solution of caustic alkali into an alcoholic suspension of a Bz1-halogen-benzanthrone, a reducing metal and a compound selected from the group comprising tellurium and oxides thereof.

MELVIN A. PERKINS.